(12) United States Patent
Colombo

(10) Patent No.: US 6,767,601 B2
(45) Date of Patent: Jul. 27, 2004

(54) MULTILAYER LAMINATE FOR USE IN CHEMICAL BARRIER PACKAGING

(75) Inventor: Frank J. Colombo, Rochester, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/973,644

(22) Filed: Oct. 9, 2001

(65) Prior Publication Data

US 2003/0066778 A1 Apr. 10, 2003

(51) Int. Cl.⁷ .............................. B32B 1/00; B32B 1/02
(52) U.S. Cl. .................... 428/35.7; 428/34.1; 428/35.7; 428/475.8; 428/475.2
(58) Field of Search .............................. 428/34.1, 35.7, 428/34.3, 475.2, 475.8

(56) References Cited

U.S. PATENT DOCUMENTS

| | | | | |
|---|---|---|---|---|
| 4,562,936 A | * | 1/1986 | Deflander | 220/268 |
| 5,320,236 A | | 6/1994 | Gregory | 215/344 |
| 5,352,043 A | * | 10/1994 | Takagaki et al. | 383/104 |
| 5,755,081 A | * | 5/1998 | Rivett et al. | 53/477 |
| 5,938,337 A | | 8/1999 | Provan et al. | 383/5 |
| 6,065,591 A | | 5/2000 | Dill et al. | 206/233 |
| 6,148,588 A | | 11/2000 | Thomas et al. | 53/412 |

FOREIGN PATENT DOCUMENTS

WO    WO95/15992    *    6/1995

* cited by examiner

*Primary Examiner*—Harold Pyon
(74) *Attorney, Agent, or Firm*—Virginia Szigeti

(57) ABSTRACT

A multilayer laminate suitable for use as a packaging film, more particularly for use as a chemical barrier packaging film, and suitable for packaging products such as motor oils and solvent impregnated cloths. The package is useful in applications which allow users to avoid the need to use spray bottles to dispense solvents, thus protecting users from inhaling hazardous chemicals from the air.

The multilayer film comprises an inner layer comprising an unoriented nylon; a middle layer comprising either a polyolefin, a metal foil, or a polyester attached to a surface of the inner layer; and an outer layer comprising either a polyolefin or a polyester attached to a surface of the middle layer; such that when the middle layer comprises a polyolefin, the outer layer comprises a polyester, and when the middle layer comprises a polyester, the outer layer comprises a polyolefin.

12 Claims, No Drawings

MULTILAYER LAMINATE FOR USE IN CHEMICAL BARRIER PACKAGING

BACKGROUND OF THE INVENTION

1. Field of the Invention

The invention relates to a multilayer laminate suitable for use as a packaging film. More particularly, the invention pertains to a multilayer laminate for use as a chemical barrier packaging film and suitable for packaging products such as solvent impregnated materials and motor oils.

2. Description of the Related Art

Packaging films are well known multilayered structures which may be used to store a variety of products. Regardless of the type of product stored in the package, it is necessary that the package be capable of sealing the product from contact with the atmosphere surrounding the package. For example, if the package is used to store a food product, it is necessary that the package be tailored to have good moisture and oxygen barrier properties to prevent the food from spoiling. Packaging films must also be capable of containing the product without the film degrading due to the type of product. For example, when storing chemical compositions or solvents it is important that the chemical or solvent does not corrode the package. This is particularly a concern with certain organic solvents. Organic solvents enjoy diverse application in a multitude of industries. One typical use for organic solvents is as a cleanser. In general, it is necessary to package such cleansers in plastic spray bottles that are strong enough to store the solvent without being eaten away by the solvent. However, using spray bottles to dispense an organic solvent or cleanser can cause a dangerous condition for workers who might inadvertently inhale the spray. It has therefore become useful in the art to provide a disposable cloth impregnated with an organic solvent or other cleanser without the need for a spray bottle. A consumer can thereby use the solvent impregnated cloth and dispose of it when it is no longer useful.

Although solvent impregnated cloths are available as rolls, as bulk-like baby wipes, or in loose form in bulk packages, it would be advantageous to produce such solvent impregnated cloths in individually wrapped chemical barrier packages. It is further desirable that such a package be flexible so that it can be easily stored and discarded after use of the product inside.

SUMMARY OF THE INVENTION

The invention provides a multilayered chemical barrier film comprising:

a) an inner layer comprising an unoriented nylon;
b) a middle layer comprising either a polyolefin, a metal foil, or a polyester attached to a surface of the inner layer; and
c) an outer layer comprising either a polyolefin or a polyester attached to a surface of the middle layer;

such that when the middle layer comprises a polyolefin, the outer layer comprises a polyester, and when the middle layer comprises a polyester, the outer layer comprises a polyolefin.

The invention also provides a package comprising a casing which defines an inner compartment, said casing comprising a pair of overlapping chemical barrier films, each of said chemical barrier films comprising in order from the inner part of the package to the outer part of the package:

a) an inner layer comprising an unoriented nylon;
b) a middle layer comprising either a polyolefin, a metal foil or a polyester attached to a surface of the inner layer; and
c) an outer layer comprising either a polyolefin or a polyester attached to a surface of the middle layer;

such that when the middle layer comprises a polyolefin, the outer layer comprises a polyester, and when the middle layer comprises a polyester, the outer layer comprises a polyolefin,
and wherein the overlapping chemical barrier films are sealed together by directly attached portions of the inner nylon layers around a perimeter of the inner nylon layers.

The invention further provides a package comprising a casing which defines an inner compartment, said casing comprising a single chemical barrier film, said chemical barrier film comprising in order from the inner part of the package to the outer part of the package:

a) an inner layer comprising an unoriented nylon;
b) a middle layer comprising either a polyolefin or a polyester attached to a surface of the inner layer; and
c) an outer layer comprising either a polyolefin, a metal foil, or a polyester attached to a surface of the middle layer;

such that when the middle layer comprises a polyolefin, the outer layer comprises a polyester, and when the middle layer comprises a polyester, the outer layer comprises a polyolefin,
and wherein the chemical barrier film is folded at an edge and sealed to itself by directly attached portions of the inner nylon layer around at least a portion of perimeter of the inner nylon layer.

The present invention provides a solution to the needs mentioned above.

A multilayer laminate is provided which acts as a chemical barrier and may be formed into a storage bag or container for motor oils, solvent impregnated cloths, other products. Such containers may be easily stored and disposed after product use. The nylon layer provides resistance to chemicals as well as a heat seal layer. The polyester or metal foil layer permits retention of the solvent in the package, for example. The polyolefin layer provides added strength, flexibility and puncture resistance to the structure.

DETAILED DESCRIPTION OF THE PREFERRED EMBODIMENTS

In the production of a chemical barrier film according to the invention, an inner layer, a middle layer and an outer layer are attached together to form a multilayered film. While the type of composition comprising the middle and outer layers may vary, it is important to the scope of the invention that the inner layer comprise an unoriented nylon structure.

Suitable nylons within the scope of the invention for use in the inner layer non-exclusively include homopolymers or copolymers selected from aliphatic polyamides and aliphatic/aromatic polyamides having a molecular weight of from about 10,000 to about 100,000. General procedures useful for the preparation of polyamides are well known to the art. Such include the reaction products of diacids with diamines. Useful diacids for making polyamides include dicarboxylic acids which are represented by the general formula

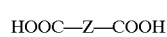

wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula

wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4 trimethylpentamethylenediamine, as well as cycloaliphatic diamines, such as diaminodicyclohexylmethane, and other compounds. Other useful diamines include heptamethylenediamine, nonamethylenediamine, and the like.

Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene adipamide) (nylon 6,6), poly(hexamethylene sebacamide) (nylon 6,10), poly (heptamethylene pimelamide) (nylon 7,7), poly (octamethylene suberamide) (nylon 8,8), poly (hexamethylene azelamide) (nylon 6,9), poly (nonamethylene azelamide) (nylon 9,9), poly (decamethylene azelamide) (nylon 10,9), poly (tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here.

Of these polyamides, preferred polyamides include nylon 6, nylon 6,6, nylon 6/6,6as well as mixtures of the same. Of these, nylon 6 is most preferred. It is also preferred that the nylon be heat sealable.

Aliphatic polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®.

Exemplary of aliphatic/aromatic polyamides include poly (tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethyleneterephthalamide (nylon 6,6/6T), poly (2,2,2-trimethyl hexamethylene terephthalamide), poly(m-xylylene adipamide) (MXD6), poly(p-xylylene adipamide), poly(hexamethylene terephthalamide), poly (dodecamethylene terephthalamide), polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267.

Attached to a surface of the inner nylon layer is a middle layer, and attached to an opposite surface of the middle layer is an outer layer. The middle layer may comprise either a polyolefin, a metal foil or a polyester, while the outer layer may comprise either a polyolefin or a polyester. Preferably, the metal foil is an aluminum foil. Although it is not conventionally known to incorporate metallic foils other than aluminum foils in multilayered packaging films, it is within the scope of the invention that any metallic foil, such as a copper foil or a nickel foil, may be used if desired.

The polyolefins used herein non-exclusively include polymers of alpha-olefin monomers having from about 2 to about 6 carbon atoms and includes homopolymers, copolymers (including graft copolymers), and terpolymers of alpha-olefins. Illustrative homopolymer examples include ultra low density polyethylene (ULDPE), low density polyethylene (LDPE), linear low density polyethylene (LLDPE), medium density polyethylene (MDPE), or high density polyethylene (HDPE); polypropylene; polybutylene; polybutene-1; poly-3-methylbutene-1; poly-pentene-1; poly-4-methylpentene-1; polyisobutylene; and polyhexene.

Polyolefins such as polyethylenes are commonly differentiated based on the density which results from their numbers of chain branches per 1,000 carbon atoms in the polyethylene main chain in the molecular structure. Branches typically are $C_3$–$C_8$ olefins, and which are preferably butene, hexene or octene. For example, HDPE has very low numbers of short chain branches (less than 20 per 1,000 carbon atoms), resulting in a relatively high density, i.e. density ranges from about 0.94 gm/cc to about 0.97 gm/cc. LLDPE has more short chain branches, in the range of 20 to 60 per 1,000 carbon atoms with a density of about 0.91 to about 0.93 gm/cc. LDPE with a density of about 0.91 to about 0.93 gm/cc has long chain branches (20–40 per 1,000 carbon atoms) instead of short chain branches in LLDPE and HDPE. ULDPE has a higher concentration of short chain branches than LLDPE and HDPE, i.e. in the range of about 80 to about 250 per 1,000 carbon atoms and has a density of from about 0.88 to about 0.91 gm/cc. Of these, low density polyethylene is the most preferred. Illustrative copolymer and terpolymers include copolymers and terpolymers of alpha-olefins with other olefins such as ethylene-propylene copolymers; ethylene-butene copolymers; ethylene-pentene copolymers; ethylene-hexene copolymers; and ethylene-propylene-diene copolymers (EPDM). The term polyolefin as used herein also includes acrylonitrilebutadiene-styrene (ABS) polymers, copolymers with vinyl acetate, acrylates and methacrylates and the like. Preferred polyolefins are those prepared from alpha-olefins, most preferably ethylene polymers, copolymers, and terpolymers. The above polyolefins may be obtained by any known process. The polyolefin may have a weight average molecular weight of about 1,000 to about 1,000,000, and preferably about 10,000 to about 500,000. Preferred polyolefins are polyethylene, polypropylene, polybutylene and copolymers, and blends thereof. The most preferred polyolefin is polyethylene.

Polyesters are typically produced as a reaction product of a diol and a dicarboxylic acid. Suitable polyesters non-exclusively include those made from ethylene glycol and terephthalic acid, such as polyethylene terephthalate (PET), from ethylene glycol and naphthalene-2,6-dicarboxylic acid, such as polyethylene2,6-naphthalate (PEN), from 1,4-bishydroxymethyl-cyclohexane and terephthalic acid, such as poly-1,4-cyclohexanedimethylene terephthalate (PCDT), or from ethylene glycol, naphthalene-2,6-dicarboxylic acid and biphenyl-4,4'-dicarboxylic acid, such as polyethylene 2,6-naphthalate bibenzoate (PENBB). Preferred are polyesters which are composed of at least 90 mol %, more preferably at least 95 mol % of ethylene glycol and terephthalic acid units or of ethylene glycol and naphthalene-2,6-dicarboxylic acid units. The remaining monomer units are derived from other aliphatic, cycloaliphatic or aromatic diols and dicarboxylic acids. Of these the most preferred polyester is polyethylene terephthalate.

Examples of other suitable aliphatic diols are diethylene glycol, triethylene glycol, aliphatic glycols of the formula:

where n is an integer from 3 to 6, such as 1,3-propanediol, 1,4-butanediol, 1,5-pentanediol and 1,6-hexanediol, or branched aliphatic glycols having up to 6 carbon atoms. Preferred cycloaliphatic diols include cyclohexanediols, particularly 1,4-cyclohexanediol. Examples of other suitable aromatic diols are those of the formula:

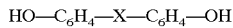

where X is —CH$_2$—, —C(CH$_3$)$_2$—, —C(CF$_3$)$_2$—, —O—, —S— or —SO$_2$—. Also suitable are bisphenols of the formula:

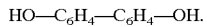

Other preferred aromatic dicarboxylic acids are benzene dicarboxylic acids, naphthalene dicarboxylic acids, for example naphthalene-1,4- or 1,6-dicarboxylicacid, biphenyl-x,x'-dicarboxylic acids, for example biphenyl-4,4'-dicarboxylic acid, diphenylacetylene-x,x'-dicarboxylic acids such as diphenylacetylene-4,4'-dicarboxylic acid and stilbene-x,x'-dicarboxylic acids. Suitable cycloaliphatic dicarboxylic acids include cyclohexanedicarboxylic acids such as cyclohexane-1,4-dicarboxylic acid. Suitable aliphaticdicarboxylic acids are the C3–C$_{19}$-alkanedioic acids, having straight-chain or branched alkane groups.

The polyesters may be prepared by a trans-esterification process, the starting materials for which are dicarboxylic esters and diols, which are reacted using customary trans-esterification catalysts, such as salts of zinc, calcium, lithium, magnesium and manganese. The intermediates are then polycondensed in the presence of widely used polycondensation catalysts, such as antimonytrioxide or titanium salts. The preparation may be carried out just as successfully by a direct esterification process in the presence of polycondensation catalysts, starting directly from the dicarboxylic acids and the diols.

In a preferred embodiment of the invention, the polyester layer may further comprise a metallized polyester, an aluminum oxide coated polyester, a silicon oxide coated polyester, a polyvinylidene chloride coated polyester, or combinations thereof. Such are well known in the art. A "metallized polyester" is intended to mean a polyester having a thin layer of metal attached to its surface or having metal mixed together with the polyester to form part of the layer. Such metallized polyester may be metallized with any suitable metal, such as aluminum, although other metals may be employed (e.g., copper, nickel, etc).

The middle layer and the outer layer are attached together such that such that when the middle layer comprises a polyolefin, the outer layer comprises a polyester, and when the middle layer comprises a polyester, the outer layer comprises a polyolefin. Further each of the middle layer and the outer layer may be either oriented or unoriented. In the preferred embodiment of the invention, each of the middle layer and outer layer are oriented. In contrast, the inner nylon layer is an unoriented; that is, it is either a cast or blown film structure which is not subsequently subject to an orientation process.

Each of the inner, middle and outer layers may be attached together either by coextrusion or by lamination via an intermediate adhesive layer. Of these, it is preferred that each of the inner and middle layers are coextruded while the outer layer is attached by lamination via an intermediate adhesive layer or tie layer. Also, when the middle layer comprises a metal foil, it is preferred that the layer be laminated to either the inner or outer layer.

The adhesive layer may be applied directly onto the any of the inner, middle or outer layers by any appropriate means in the art, such as by coating. Any suitable adhesive may be employed. Such adhesives include polyurethanes, epoxies, polyesters, acrylics, anhydride modified polyolefin and blends thereof. Modified polyolefin compositions have at least one functional moiety, such as those selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. The adhesive layer may also optionally comprise a colorant, an ultraviolet light absorber or both.

Each of the inner, middle and outer layers may optionally also include one or more conventional additives whose uses are well known to those skilled in the art. The use of such additives may be desirable in enhancing the processing of the compositions as well as improving the products formed therefrom.

Examples of such include oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Such may be used in amounts, for example, of up to about 10% by weight of the layer. Representative ultraviolet light stabilizers include various substituted resorcinols, salicylates, benzotriazole, benzophenones, and the like. Suitable lubricants and release agents include stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

As mentioned above, the layers may be attached together by coextrusion. For example, the polymeric material for the individual layers are fed into infeed hoppers of a like number of extruders, each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Additional rolls may be employed. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Typical coextrusion techniques are described in U.S. Pat. Nos. 5,139,878 and 4,677,017.

Alternatively the individual layers may first be formed as separate layers and then laminated together under heat and pressure with or without intermediate adhesive layers. Lamination techniques are well known in the art. Typically, laminating is done by positioning the individual layers on one another under conditions of sufficient heat and pressure to cause the layers to combine into a unitary film. Typically the inner, middle and outer layers, along with intermediate adhesive layers, are positioned on one another, and the combination is passed through the nip of a pair of heated laminating rollers by techniques well known in the art. Lamination heating may be done at temperatures ranging from about 120° C. to about 175° C., preferably from about 150° C. to about 175° C., at pressures ranging from about 5 psig (0.034 MPa) to about 100 psig (0.69 MPa), for from about 5 seconds to about 5 minutes, preferably from about 30 seconds to about 1 minute.

As discussed above, the middle and outer layers are preferably oriented prior to being attached together, unless the middle layer is a metal (e.g., aluminum) foil, which is not orientable. For the purposes of the present invention the term draw ratio is an indication of the increase in the dimension in the direction of draw. Preferably, in the present invention the polyolefin or polyester films are drawn to a draw ratio of from 1.5:1 to 5:1 uniaxially in at least one direction, i.e. its longitudinal direction, its transverse direction or biaxially in each of its longitudinal and transverse directions. Preferably, these films are biaxially oriented, either sequentially or simultaneously in both the machine and transverse directions, or merely being blown into a film structure. This results in dramatic improvements in clarity, strength and toughness properties. As mentioned above, the nylon film is unoriented.

Although each layer of the multilayer film structure may have a different thickness, the thickness of the inner nylon layer is from about 1 $\mu$m to about 50 $\mu$m, preferably from about 5 $\mu$m to about 40 $\mu$m, and more preferably from about 5 $\mu$m to about 10 $\mu$m. The thickness of the polyolefin layer is from about 1 $\mu$m to about 25 $\mu$m, preferably from about 5 $\mu$m to about 15 $\mu$m and more preferably from about 5 $\mu$m to about 13 $\mu$m. The thickness of the polyester layer is from about 1 $\mu$m to about 65 $\mu$m, preferably from about 5 $\mu$m to about 50 $\mu$m and more preferably from about 5 $\mu$m to about 25 $\mu$m. While such thicknesses are preferred, it is to be understood that other film thicknesses may be produced to satisfy a particular need and yet fall within the scope of the present invention.

The oxygen transmission rate (OTR) of the multilayered film of the invention may be determined via the procedure of ASTM D-3985. In the preferred embodiment, the multilayered film according to this invention has an OTR of about 0.1 cc/100 in$^2$/day or less, preferably from about 0.085 cc/100 in$^2$/day or less and more preferably from about 0.07 cc/100 in$^2$/day or less at 65% relative humidity at 20° C.

The multilayered film of the invention may be heat shrinkable, generally by an amount of from about 2% to about 30%, more preferably from about 10% to about 20% in its length, or its width or each of its length and width. The multilayered film may further have printed indicia on an aluminum foil middle layer. Since such printing is on an internal surface of the structure, it will not rub off when the surface is contacted.

The film preferably has a puncture resistance of at least about 1600 grams as measured by ASTM F 1306. Preferably the film has a haze of about 5% or less as measured by ASTM D1003.

The multilayered film is useful for forming a package capable of storing a product, such as an organic solvent or solvent-containing material, such as a solvent soaked into an absorbent fabric. Such solvents may non-exclusively include ketones such as acetone or methyl ethyl ketone, alcohols, or hydrocarbons such as toluene. The package is also appropriate for storage of a variety of other products, such as motor oil. The package comprises a casing which defines an inner compartment for holding the product, said casing comprising a pair of overlapping chemical barrier films, each of said chemical barrier films comprising in order from the inner part of the package to the outer part of the package: the inner nylon layer, the middle layer and the outer layer. The overlapping chemical barrier films are heat sealed together by directly attached portions of the inner nylon layers around a perimeter of the inner nylon layers. Alternately, the package may be formed from a single chemical barrier film wherein the film is folded at an edge and sealed to itself by directly attached portions of the inner nylon layer around at least a portion of perimeter of the inner nylon layer.

The following non-limiting examples serve to illustrate the invention.

EXAMPLE 1

A film having a cast nylon 6 inner layer, a polyethylene terephthalate middle layer, and a polyethylene outer layer is formed. The middle and outer layers are laminated together and the nylon inner layer is then laminated onto a surface of the polyethylene terephthalate middle layer via a polyurethane based adhesive. The nylon layer is not oriented. The middle and outer layers are biaxially oriented. The film is then folded in half and onto itself such that the nylon layer is touching itself. The sides are heat sealed together to form a package having an enclosure. A flap of polyethylene with a zipper is then attached to the top of the folded film. A toluene impregnated cloth is then placed within the enclosure and the zipper and top portion of the package are sealed.

EXAMPLE 2

Example 1 is repeated except the middle layer comprises a metallized polyethylene terephthalate (metallized with aluminum) and the outer layer comprises a polyethylene. The metallized polyethylene is unoriented and the polyethylene is oriented. Also, each of the layers are laminated together via a polyurethane based adhesive.

EXAMPLE 3

Example 2 is repeated except the middle layer comprises an aluminum foil and the package is formed from two separate, identical films rather than a single film folded onto itself. The adjacent nylon layers are attached.

EXAMPLE 4

A pair of films having a cast nylon 6 inner layer, a polyethylene terephthalate middle layer, and a polyethylene outer layer is formed. The middle and outer layers are laminated together and the nylon inner layer is then laminated onto a surface of the polyethylene terephthalate middle layer via a polyurethane based adhesive. The nylon layer is not oriented. The middle and outer layers are biaxially oriented. A toluene impregnated cloth is then positioned between the two films such that cast nylon layers are touching around the perimeter of the cloth. The four sides of the films are heat sealed together to form a package.

EXAMPLE 5

A pair of film having a cast nylon 6 inner layer, a polyethylene terephthalate middle layer, and a polyethylene outer layer is formed. The middle and outer layers are laminated together and the nylon inner layer is then laminated onto a surface of the polyethylene terephthalate middle layer via a polyurethane based adhesive. The nylon layer is not oriented. The middle and outer layers are biaxially oriented. Three edges of the films are heat sealed together to form an open top pouch. A quantity of 10W40 grade motor oil is poured into the open end of the pouch and then the pouch is heat sealed along its top edge.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A package comprising a casing which defines an inner compartment, said casing comprising a pair of overlapping multilayer films, each of said multilayer films comprising in order from the inner part of the package to the outer part of the package:

a) an inner layer comprising an unoriented nylon selected from the group consisting of nylon 6, nylon 6,6 nylon, 6/6 and mixtures thereof;

b) a middle layer comprising a biaxially oriented polyester attached to a surface of the inner layer; and c) an outer layer comprising a biaxially oriented polyolefin attached to a surface of the middle layer;

a product within said inner compartment, said product comprising an absorbent fabric and solvent absorbed within said fabric;

and wherein the overlapping multilayer films are sealed together by directly attached portions of the inner nylon layers around a perimeter of the inner nylon layers.

2. The package of claim 1 further comprising an adhesive layer positioned between said outer and middle layers, and also between said middle and inner layers.

3. The package of claim 1 wherein said polyolefin comprises a polyethylene or polypropylene.

4. The package of claim 1 wherein said polyester comprises polyethylene terephthalate.

5. The package of claim 1 wherein said polyester comprises a metallized polyester, an aluminum oxide coated polyester, a silicon oxide coated polyester, a polyvinylidene chloride coated polyester, or combinations thereof.

6. A package comprising a casing which defines an inner compartment, said casing comprising a single multilayer film, said multilayer film comprising in order from the inner part of the package to the outer part of the package:

a) an inner layer comprising an unoriented nylon selected from the group consisting of nylon 6, nylon 6,6 nylon, 6/6 and mixtures thereof;

b) a middle layer comprising a biaxially oriented polyester attached to a surface of the inner layer; and c) an outer layer comprising a biaxially oriented polyolefin attached to a surface of the middle layer;

a product within said inner compartment, said product comprising an absorbent fabric and solvent absorbed within said fabric;

and wherein the multilayer film is folded at an edge and sealed to itself by directly attached portions of the inner nylon layer around at least a portion of perimeter of the inner nylon layer.

7. The package of claim 1 wherein said polyolefin comprises polyethylene and said polyester comprises polyethylene terephthalate.

8. The package of claim 1 wherein said inner layer consists essentially of an unoriented nylon 6, said middle layer consists essentially of a biaxially oriented polyethylene terephthalate and said outer layer consists essentially of a biaxially oriented polyethylene.

9. The package of claim 6 wherein said polyolefin comprises polyethylene and said polyester comprises polyethylene terephthalate.

10. The package of claim 6 wherein said inner layer consists essentially of an unoriented nylon 6, said middle layer consists essentially of a biaxially oriented polyethylene terephthalate and said outer layer consists essentially of a biaxially oriented polyethylene.

11. The package of claim 1 wherein said nylon is nylon 6.

12. The package of claim 6 wherein said nylon is nylon 6.

* * * * *